United States Patent
Finch

[19]

[11] Patent Number: 5,823,723
[45] Date of Patent: *Oct. 20, 1998

[54] VEHICLE WHEEL TIEDOWN

[75] Inventor: Thomas E. Finch, Spring Branch, Tex.

[73] Assignee: TEFTEC Corporation, Spring Branch, Tex.

[*] Notice: This patent issued on a continued prosecution application filed under 37 CFR 1.53(d), and is subject to the twenty year patent term provisions of 35 U.S.C. 154(a)(2).

[21] Appl. No.: 746,099

[22] Filed: Nov. 5, 1996

[51] Int. Cl.⁶ .................................................. B60P 7/08
[52] U.S. Cl. .................................. 410/22; 410/9; 410/10; 410/19; 410/23
[58] Field of Search ................... 410/3, 4, 7, 9, 410/10, 11, 12, 19, 21, 22, 23, 96; 24/68 CD, 265 CD, 302; 248/499; 224/42.4; 280/304.1; 296/65.1

[56] References Cited

U.S. PATENT DOCUMENTS

| | | | |
|---|---|---|---|
| 1,394,038 | 10/1921 | Marinier et al. | 410/21 X |
| 1,557,449 | 10/1925 | Fennell | 410/22 |
| 1,708,613 | 4/1929 | Girard | 410/22 |
| 1,724,556 | 8/1929 | Blakely | 410/22 |
| 1,733,269 | 10/1929 | Mauk et al. | 410/10 X |
| 1,838,975 | 12/1931 | Williams | 410/22 |
| 3,229,952 | 1/1966 | Zumbo | 24/68 CD X |
| 3,826,473 | 7/1974 | Huber | 24/68 CD X |
| 4,257,644 | 3/1981 | Stephens | 410/12 X |
| 4,601,620 | 7/1986 | Bugger et al. | 410/22 |
| 4,995,775 | 2/1991 | Gresham | 410/10 |

FOREIGN PATENT DOCUMENTS

| 1242131 | 8/1960 | France | 410/4 |
|---|---|---|---|

Primary Examiner—Stephen T. Gordon
Attorney, Agent, or Firm—Cox & Smith Incorporated

[57] ABSTRACT

An apparatus for effecting the securement of the wheels of a wheeled vehicle, such as a power wheelchair, to the floor or bed of a transport vehicle having tension connection anchors in the floor respectively vertically below the desired position of the wheels, comprises a hubcap securable to each wheel, a connector plate slidably mountable on each hubcap and a tensile connection such as a strap, cable, chain or the like adjustably secured between each connector plate and a vertically adjacent tension connection anchor.

2 Claims, 1 Drawing Sheet

VEHICLE WHEEL TIEDOWN

FIELD OF THE INVENTION

This invention relates to an apparatus for effecting the securement or tie down of one or more wheels of a wheeled vehicle to the bed or support surface of a transport vehicle. This invention is of particular value in effecting the securement of a patient occupied wheelchair to the floor of a conventional van, but can be utilized for any wheeled vehicle being transported by a larger vehicle.

BACKGROUND OF THE INVENTION

A typical family having a patient requiring a power wheelchair also requires frequent transport to a doctor, or a rehabilitation hospital, or to participate in activities of the family outside of the home. Many such families acquire a conventional van for such transportation. Two problems are encountered if the van is to be used without expensive customization to permit a patient occupied power wheelchair to be transported in a conventional van having a side loading door.

The first problem is that the combined height of the patient and the wheelchair normally exceeds the height of the van door opening. This problem is addressed in our co-pending application, Ser. No. 08/744,204, filed Oct. 31, 1996 and incorporated herein by reference. The apparatus disclosed in said co-pending application permits a reduction in height of the power wheelchair frame relative to the supporting wheels sufficient to permit the patient in the power wheelchair to be driven up a ramp and into a conventional van through the standard side door opening.

The second problem is the anchoring of the wheelchair in the van to prevent undesired movement of the wheelchair in response to the van being abruptly braked or turned at an unsafe speed. Without such anchoring or tie down, the wheelchair can shift its position and even overturn, with consequent risk of injury to the patient and other passengers in the van.

There have been many tie down arrangements in the prior art for securing wheeled vehicles to the bed or supporting surface of a transport vehicle. These arrangements generally involve strap, cable, chain or other forms of tensile connections between the transport vehicle and the wheeled vehicle being transported. The most popular tensile connections are to the frame of the wheeled vehicle and thus involved a substantial length of the tensile connection and a greater possibility of undesired movement of the wheeled vehicle in response to transport forces.

To the knowledge of the inventor, the prior art has not proposed the use of a very short tensile connection between each wheel of the wheeled vehicle being transported and a simple anchor respectively provided in the bed or supporting surface of the transport vehicle adjacent each wheel. More specifically the prior art has not provided safe, convenient and economical tie down apparatus for a power wheelchair being transported in a conventional van.

SUMMARY OF THE INVENTION

The object of this invention is to provide a safe, convenient and economical tie down apparatus or kit for effecting the anchoring of a power wheelchair to the floor or frame of a conventional van utilized for the transport of a power wheelchair with a patient aboard. Other applications of the tie down apparatus of this invention will be readily apparent to any person concerned with the anchoring of a wheeled vehicle on a transport vehicle.

In the practice of this invention, the only modification of the van or other transport vehicle is to provide tensile connection anchors in the bed or support surface of the transport vehicle through which the tensile connection passes, or which is engaged by a hook secured to the tensile connection. A bayonet type slot engaged by a T-shaped link could also be used.

Whatever tensile connection anchors are utilized, they are preferably respectively located directly below the hub portions of the wheels of the wheeled vehicle.

A special hubcap is detachably secured to each wheel of the wheeled vehicle. Such hubcap has an external cylindrical surface that is coaxial with the wheel axis. An annular groove is formed in said external cylindrical surface on each hubcap.

A tensile connector link or plate is provided for each hubcap which defines two interconnected circular openings. The one circular opening is configured to be axially slidable over the cylindrical surface of the respective hubcap, while the second smaller circular opening is configured so that its wall is snugly engaged in the aforesaid annular groove in the external cylindrical surface of the respective hubcap. When assembled on the respective hubcap, each connector plate hangs in a vertical position with the larger diameter circular opening disposed below the hubcap.

If desired, such larger diameter circular opening could be used as a connector point for a tensile connection, such as a strap, cord or chain. For power wheelchair tie down applications, I prefer to utilize a length of bendable strap or webbing as the tensile connection. Such strap is passed through a horizontal slot formed in the lowermost portions of the tensile connector plate to form a loop. Such loop passes through a closed end of a S hook which is engaged with the tensile connection anchor located immediately below the respective wheel. The loop is closed, shortened and secured in its shortened position by any conventional buckle. The wheel is thus secured to the transport vehicle.

Thus, a very short length of any suitable tensile connection effects the anchoring of each hubcap to the vertically adjacent tensile connection anchor.

The operational steps involved in effecting the tie down of all wheels of the power wheel are obviously very simple. The hubcaps can be left on the respective wheels. The connector plate is assembled on each hubcap by a simple axial sliding motion, followed by a vertically downward motion. The strap or other form of tensile connection can be readily threaded through the slot in the tensile connector plate and the loop end of the S hook, the S hook engaged with the adjacent tensile connection anchor on the floor of the van, and the strap tightened by the buckle for each wheel.

Further objects and advantages of this invention will be apparent to those skilled in the art from the following detailed description, taken in conjunction with the annexed sheets of drawings.

DETAILED DESCRIPTION OF THE PREFERRED EMBODIMENT

Figure 1:
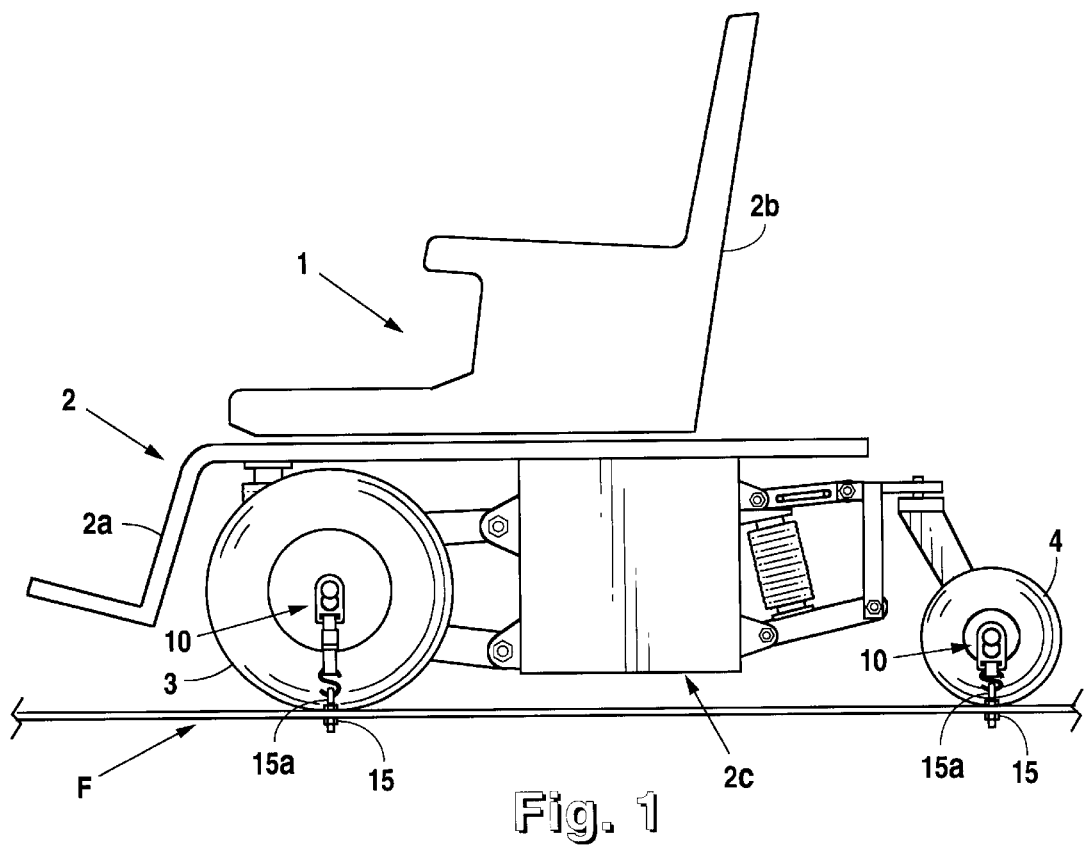
FIG. 1 is a schematic side elevational view of a power wheelchair attached to the floor of a transport vehicle by an apparatus embodying this invention.

Referring to FIG. 1 of the drawings, there is schematically illustrated a wheelchair 1 of the type shown and described in said co-pending application, Ser. No. 08/744,204, assigned to the assignee of this application, which is incorporated herein by reference. Such wheelchair has an elongated frame 2 defining a foot and leg rest 2a at its forward end and supporting a seat 2b on its medial portion. Frame 2 also defines a depending battery compartment 2c beneath the seat location.

Frame 2 is supported by two laterally spaced, power driven wheels 3 adjacent the forward end of frame 2 and by two laterally spaced caster wheels 4 mounted at the rear end of frame 2. Each of these wheels are tied down to the floor F or a frame element of a transport vehicle such as a conventional van, by a tie down apparatus 10 embodying this invention.

Figure 2:
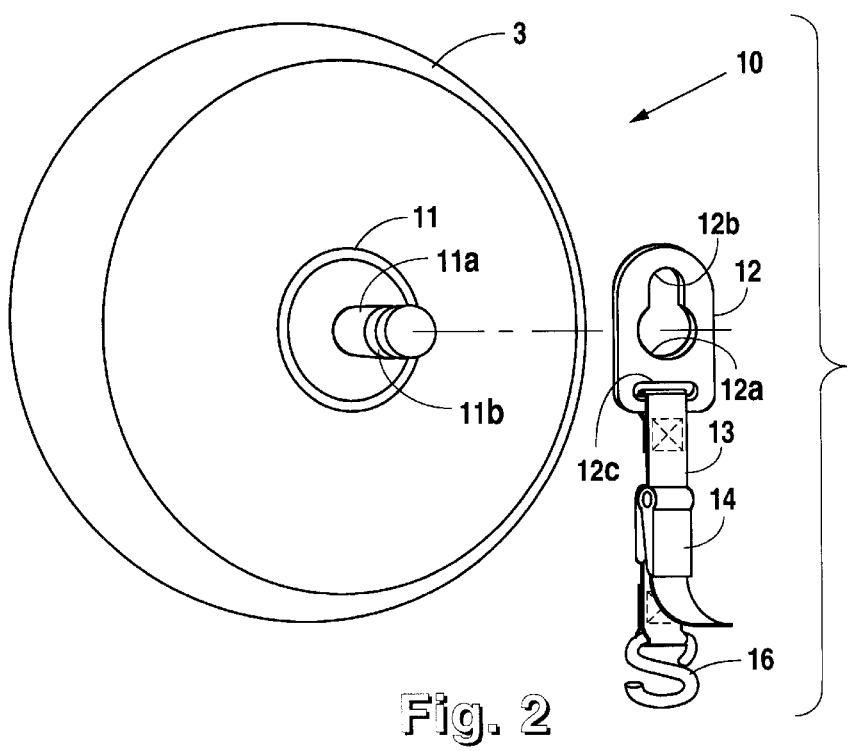
FIG. 2 is an enlarged scale exploded view of the components of the apparatus constituting this invention.

Referring now to FIG. 2, the tie down apparatus 10 comprises a plurality of hubcaps 11 which are respectively conventionally secured to the hub of each wheel 3 and 4. Hub 11 defines an external cylindrical surface 11a and this surface is provided with an annular groove 11b. While groove 11b is shown as extending completely around the cylindrical surface 11a of each hubcap for manufacturing convenience, such groove need only extend about 190° to be completely functional. Thus the term "annular" should be understood to include a groove covering more than 180° but less than 360°.

A rigid connector plate 12 is provided which is preferably of planar configuration. Plate 12 is provided to be axially slipped over the cylindrical external surface 11a of the respective hubcap 11. A second semi-cylindrical opening 12b is provided in connector plate 12 which communicates with the opening 12a and has a wall diameter that can snugly engage the annular groove 11b of the respective hubcap. The two openings thus have the appearance of an inverted keyhole. Thus each connector plate 12 can be slipped over the external cylindrical surface 11a and then moved downwardly to engage the semi-cylindrical opening 12b with the annular groove 11b. Thus a rigid connection is supplied on the hub portion of each wheel of the wheeled vehicle.

Connector plate 12 is then secured to the vehicle frame or floor F by any one of a plurality of well known adjustable tensile connecting devices. To illustrate one such device, connector plate 12 is provided with a slot 12c below the hole 12a. A strap 13 is then inserted through one end of an S hook 16 and the loop is closed by engaging in the ends of strap 13 in a conventional buckle 14 which, like a belt buckle, includes means for adjusting the length of the looped strap. The S hook is then engaged in the closed loop portion 15a of an I bolt or U bolt anchor 15 fastened to the floor or frame F of the transport vehicle at a location immediately below the desired location for each wheel of the wheeled vehicle.

After the looped strap is formed and the S hook is engaged in the floor mounted I or U bolt anchor 15, the buckle 14 is adjusted to shorten the looped strap 13 and thus apply a downward tensile force on the respective wheel hub 11, thus effectively and efficiently effecting the tie down of the wheelchair to the transport vehicle.

As previously indicated, this invention is not limited to a tie down for wheelchairs. Any wheeled vehicle may be similarly secured to the supporting surface of a transport vehicle. Any such tie down is considered to be within the scope of the appended claims.

Modifications and other applications of this invention will be obvious to those skilled in the art, and it is intended that all such modifications fall within the scope of the appended claims.

I claim:

1. A tie down apparatus for securing a vehicle wheel to a support surface having a strap anchor formed thereon vertically adjacent to said vehicle wheel, comprising in combination:

a hubcap securable to said wheel, said hubcap having a generally cylindrical external surface coaxial with the axis of the wheel;

an annular groove in said external surface of said hubcap;

a rigid connector plate of generally planar configuration;

said plate defining a generally inverted keyhole shaped opening comprising a large diameter opening permitting the axial sliding of said plate over said cylindrical surface of said hubcap, and a small diameter semi-circular opening communicating with said large diameter opening, said small diameter semi-circular opening being proportioned to snugly engage in said annular groove, whereby said small diameter semi-circular opening can be engaged with said annular groove by axially sliding said large diameter opening over said cylindrical surface and then moving said plate downwardly;

a tie down strap;

said plate having a slot traversable by said tie down strap to form a strap loop;

means for connecting said strap loop to said strap anchor; and buckle means for tightening said strap loop and securing said strap loop in a tightened position, thereby securing the vehicle wheel to the support surface.

2. A tie down mechanism for securing a wheeled vehicle in a desired location on a support surface of a transport vehicle having a plurality of strap anchors formed on said support surface, comprising, in combination:

a plurality of hubcaps respectively securable to the wheels of the wheeled vehicle, each said hubcap having a generally cylindrical external surface coaxial with the axis of the respective wheel;

an annular groove in said cylindrical external surface of each said hubcap;

a plurality of rigid connector plates of generally planar configuration, each said plate having an inverted keyhole shaped opening comprising a large diameter circular opening permitting the axial sliding engagement of each said plate with a respective one of said cylindrical external hubcap surfaces, and a small diameter semi-cylindrical opening communicating with said large diameter opening and being snugly engagable in the annular groove of the respective hubcap; whereby the wall of said small diameter opening can be positioned in the respective annular groove of a said respective hubcap;

a respective tie down strap for each said wheel of the wheeled vehicle;

means for connecting each said tie down strap to one of said strap anchors vertically beneath a said hubcap of said wheeled vehicle;

slot means in each said plate traversed by said respective tie down strap to form a strap loop; and buckle means for tightening each said strap loop to exert a hold down force on the respective wheel of the wheeled vehicle.

* * * * *